March 13, 1951 A. J. WAHL 2,545,396
DINNERWARE DECORATING APPARATUS
Filed Oct. 23, 1946 11 Sheets-Sheet 1

INVENTOR
Albert J. Wahl
BY
George J. Cominger
ATTORNEY

March 13, 1951 A. J. WAHL 2,545,396
DINNERWARE DECORATING APPARATUS
Filed Oct. 23, 1946 11 Sheets-Sheet 5

INVENTOR
Albert J. Wahl.
BY
George J. Croninger
ATTORNEY

March 13, 1951  A. J. WAHL  2,545,396
DINNERWARE DECORATING APPARATUS
Filed Oct. 23, 1946  11 Sheets-Sheet 7
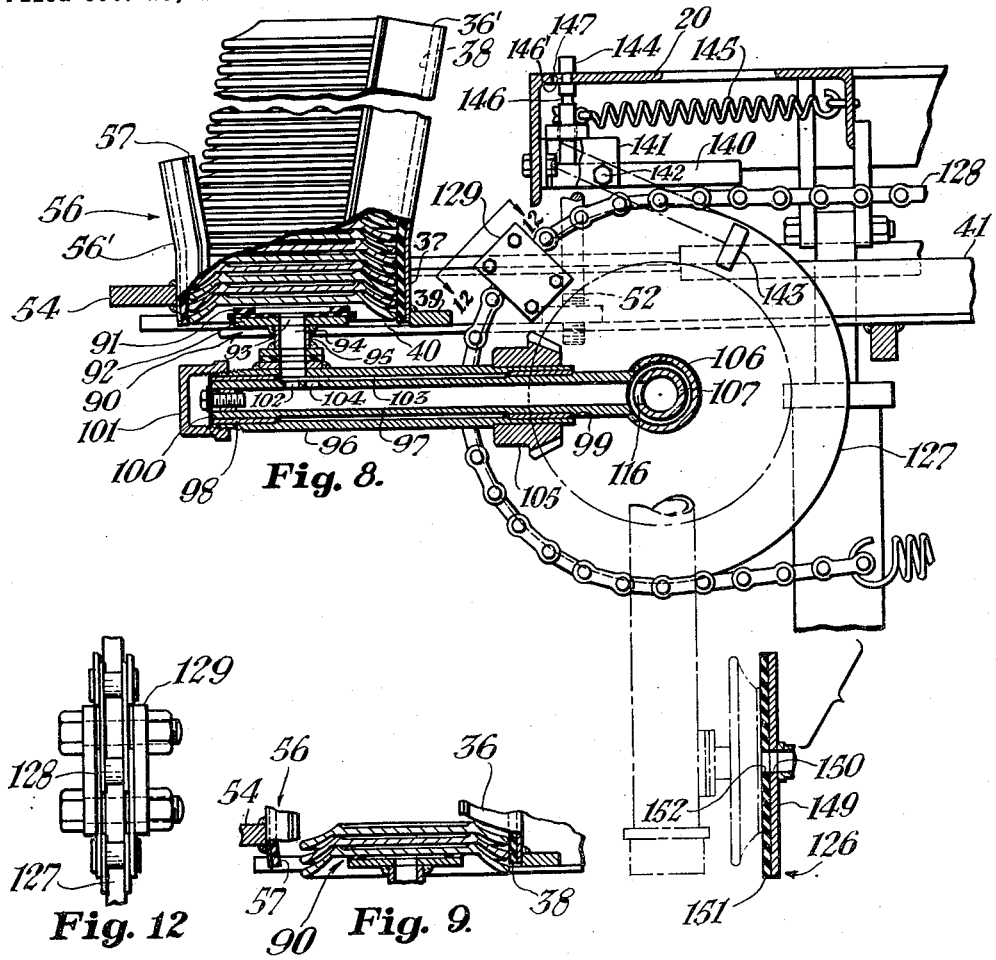
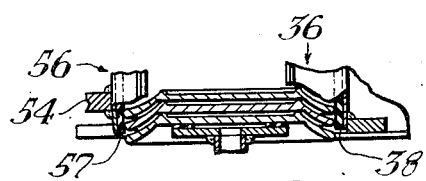
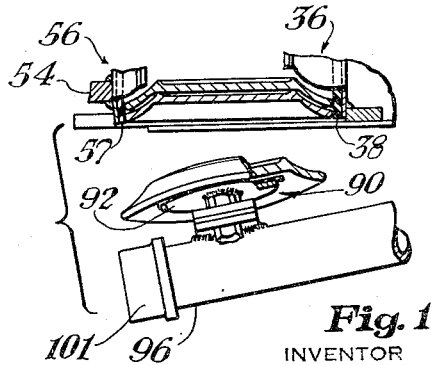
INVENTOR
Albert J. Wahl
BY
George J. Cominger
ATTORNEY March 13, 1951 A. J. WAHL 2,545,396
DINNERWARE DECORATING APPARATUS
Filed Oct. 23, 1946 11 Sheets-Sheet 8

INVENTOR
Albert J. Wahl.
BY
George J. Ceminger
ATTORNEY

March 13, 1951 — A. J. WAHL — 2,545,396
DINNERWARE DECORATING APPARATUS
Filed Oct. 23, 1946 — 11 Sheets-Sheet 9

INVENTOR
Albert J. Wahl.
BY George J. Cominger
ATTORNEY

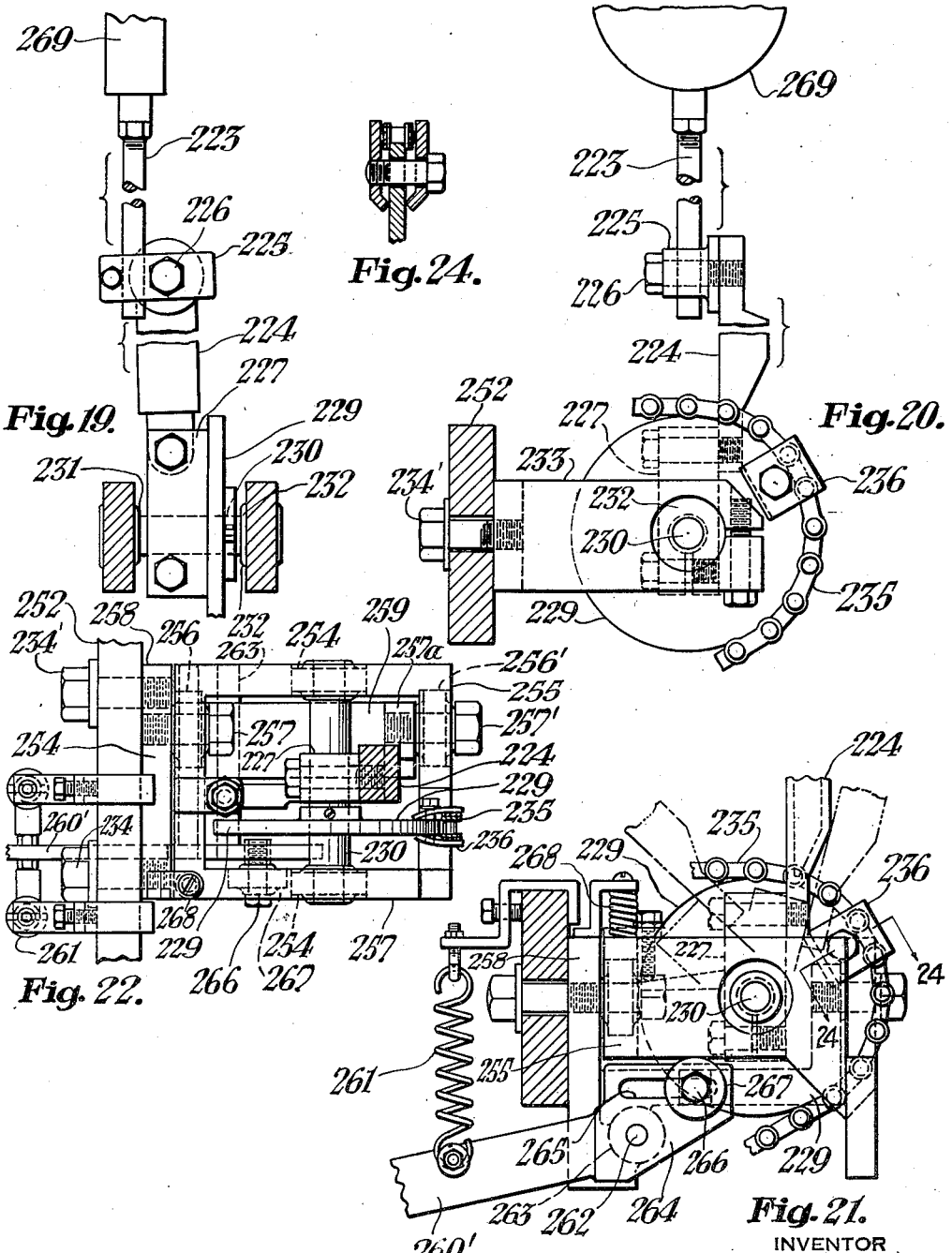

March 13, 1951  A. J. WAHL  2,545,396
DINNERWARE DECORATING APPARATUS
Filed Oct. 23, 1946  11 Sheets-Sheet 11

INVENTOR
Albert J. Wahl.
BY George J. Cominger
ATTORNEY

Patented Mar. 13, 1951

2,545,396

UNITED STATES PATENT OFFICE 2,545,396

DINNERWARE DECORATING APPARATUS

Albert J. Wahl, Pleasant Hills, Pa., assignor to Miller Pottery Engineering Company, Swissvale, Pa., a corporation of Pennsylvania Application October 23, 1946, Serial No. 705,143

23 Claims. (Cl. 91—12)

This invention relates to new and improved apparatus for use in making decorated articles, such as, for instance, decorated potteryware. For purposes of explanation, this invention will be described as the same would be used in the manufacture of under-glaze, lined, banded or striped, pottery dinnerware. Since the words "lines, bands, and stripes" are substantially synonymous, we will sometimes refer to them hereinafter as "decoration."

Heretofore, in the commercial production of pottery dinnerware, such forms of decoration as lines, bands and stripes have been applied to the ware both by hand and machine. In manual practice, the work was done in a slow and costly manner by skilled craftsmen called "hand liners" who painted the decoration on the display surface of the ware. Previous attempts to decorate the ware by machine have resulted in displacing the skilled craftsman, but the low production capacity of the machinery and the high labor requirement have hardly justified substitution of mechanical methods for manual methods.

One of the objects of this invention is to provide automatic machinery by means of which volume production of decorated articles, for instance pottery dinnerware, in commercially practical, low cost, labor saving fashion may be accomplished. Another object is to provide for production diversification both with respect to the ware that is operated upon and the decoration that is applied to the ware. Another object is to reduce the amount of manual intervention required in connection with the decorating phase of the pottery dinnerware manufacturing process. Another object is to speed up and materially simplify the decorating phase of the pottery dinnerware manufacturing process and, where the human element is involved, to make the need for any special skill or training unnecessary.

Another object of this invention is to provide automatic machinery of the class described which automatically delivers ware to the decorating position, decorates the ware, places the same in orderly fashion in a dryer, dries the decoration and delivers the ware thereafter to an unloading station.

In accordance with this invention, the apparatus comprises, a decorating machine having a plurality of decorating stations where lining or other decorating operations are performed on the ware. Each decorating station has a rotatable ware chuck for supporting the ware during decorating and automatic apparatus for applying the decoration. Automatic apparatus is also provided for collecting the output of the several stations and arranging the ware in groups that are transferred to a conveying means for carrying them through a drying zone. Said last named automatic apparatus includes a conveyor common to all the decorating stations for receiving ware therefrom, and, by virtue of the spacing of the stations and the movement of the conveyor, the ware received thereon is intermingled in such fashion that it may be subsequently assembled in predetermined lines extending through a drying zone. The operation of the automatic apparatus is controlled by the decorating machine.

In the drawings:

Figure 8 is an enlarged detail partly in section of the dealer and ware transfer.

Figure 9 is a detail, partly in section, showing the dealer in open position.

Figure 10 is a detail, partly in section, showing the dealer in closed position after a piece of ware has been released to the transfer device.

Figure 11 is a detail partly in section illustrating how the ware is turned as it is removed from the dealer by the transfer.

Figure 12 is a detail in plan taken in the direction of arrows 12—12, Figure 8.

Figure 19 is a detail of a holder assembly employed with non-traversing type banding apparatus.

Figure 20 is a side elevation of the holder assembly of Figure 19.

Figure 21 is a side elevation of a holder assembly employed with traversing type banding apparatus.

Figure 22 is a plan view of the assembly of Figure 21.

Figure 24 is a section taken on line 24—24 of Figure 21.

Figure 28:
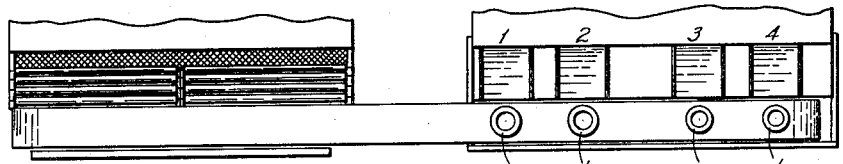
Figure 29:
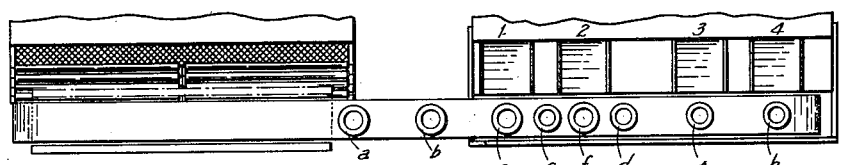
Figure 30:
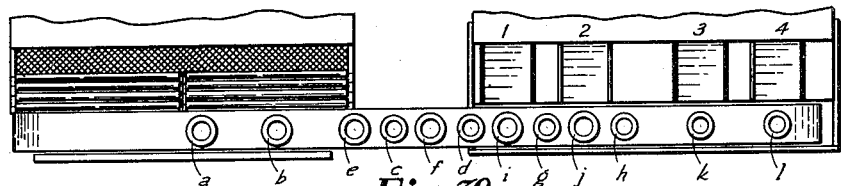
Figure 31:
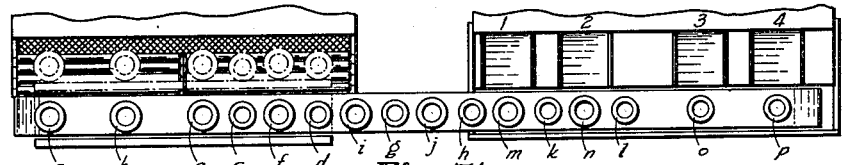

Figures 28 to 33 inclusive, are plan views which show in sequence, starting with Figure 28, the steps involved in automatically arranging the output from the decorating stations in orderly rows in the dryer.

Figure 1:
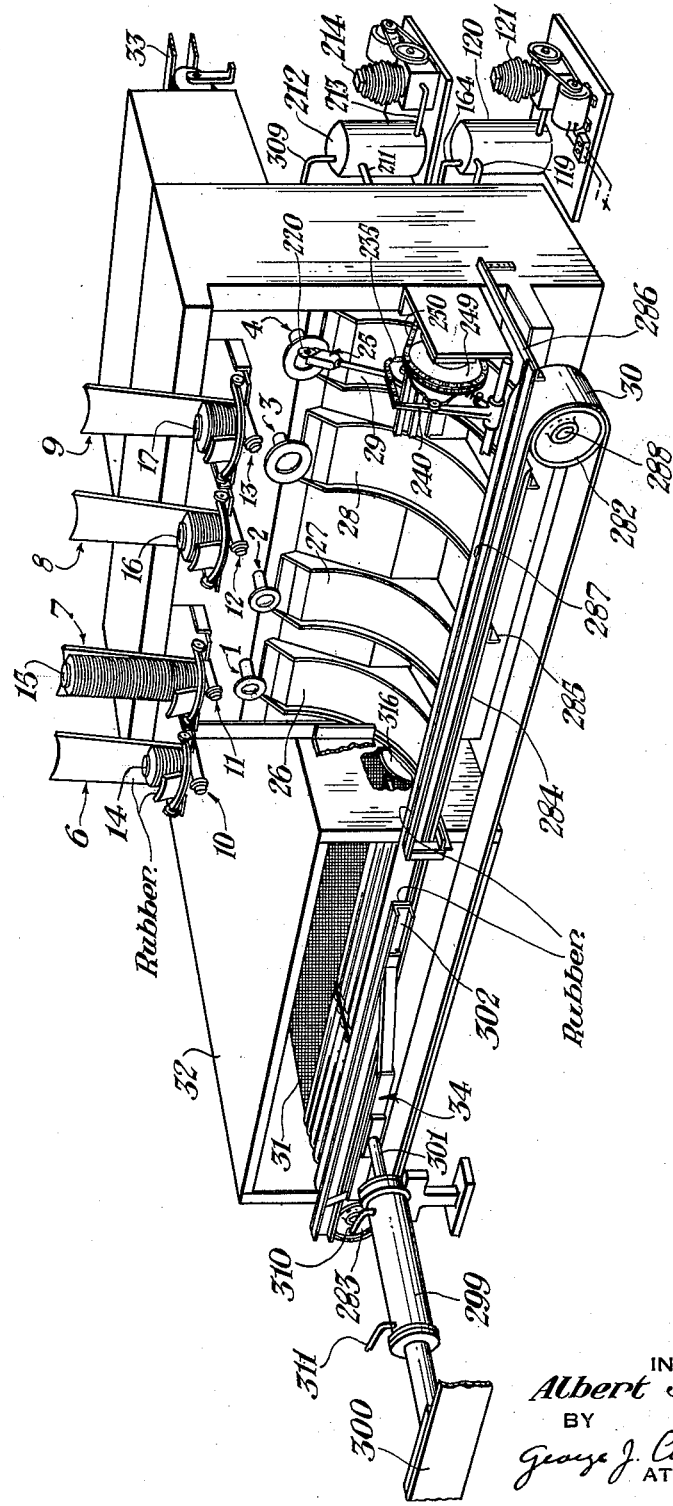
Figure 1 is a perspective view of the apparatus with some of the parts in section and others broken away or removed in order to more clearly show the external appearance of the machine and some of the main assemblies.

With reference to Figure 1, the apparatus comprises, generally, a ware decorating machine having plural decorating stations 1, 2, 3 and 4. Automatic apparatus operated by the machine for transferring ware from operator replenished stacks or bungs of ware includes a ware dealer 6, 7, 8 and 9 respectively above and in front of each station and associated ware transfer device 10, 11, 12 and 13 respectively for carrying ware from the bungs or stacks 14, 15, 16 and 17 respectively to rotatable ware receiving chucks at stations 1, 2, 3 and 4 respectively.

Apparatus for decorating the ware includes automatically operable ware decorating means generally designated by the numeral 25, at station 4, there being one or more of said means associated with each of said stations 1, 2 and 3 but not being shown in Figure 1 in order not to obscure other details. Each of these decoration applying means has a decorating implement, to be automatically moved into and out of engagement with the surface of ware to apply thereto a line, band or stripe the operation thereof being in timed relation to the operation of the ware transfer and other apparatus as will be explained in greater detail hereinafter.

Although I have shown only one implement for decorating means 25 at station 4, it will be understood that more than one implement may be employed at a single station for the purpose of forming plural lines, bands or stripes on the ware.

Figures 2, 14:
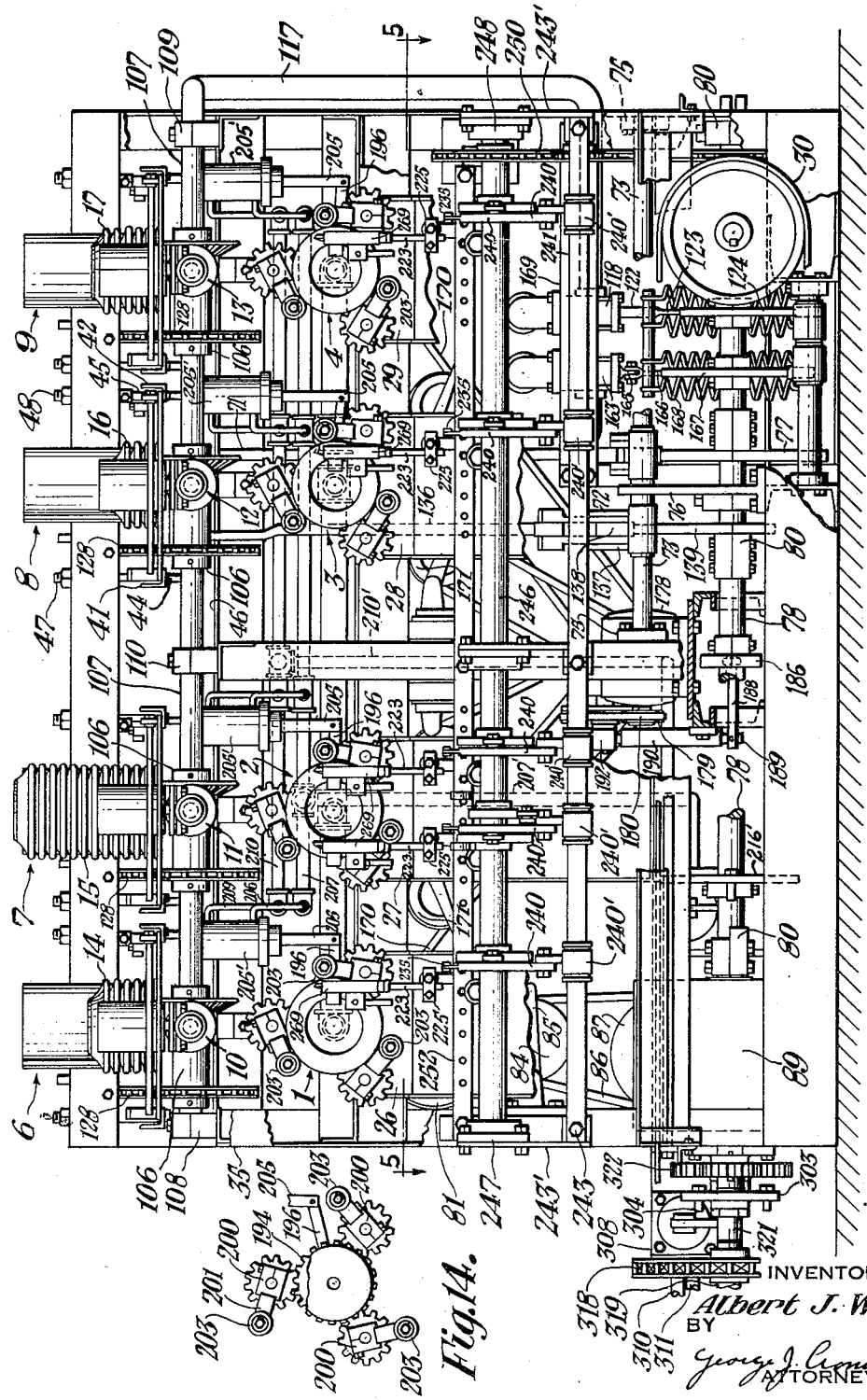
Figure 2 is a front elevation of the decorating machine which forms part of the apparatus.
Figure 14 is a detail showing some of the ware centering apparatus.

The ware that is to be decorated is arranged in vertical stacks or bungs, Figures 1 and 2, several pieces high, in the several dealers. The production may be diversified as between decorating stations and the ware undergoing decoration at one station may be of different size, shape or contour than ware undergoing decoration at another station. The dealers, 6, 7, 8 and 9 are filled with ware by hand, and, since this represents the operator's principal duty, it can readily be understood why unskilled labor may be employed for the work.

Ware that has been decorated is released from the several chucks at the decorating stations and is discharged by gravity down the several chutes 26, 27, 28 and 29 respectively. One of these chutes is associated with each decorating station. Automatic apparatus for collecting and arranging the decorated ware includes a carrier in the form of an endless conveyor belt 30 common to all decorating stations and located adjacent the discharge end of the several chutes and upon whose upper run the ware is received in predetermined spaced relation as will be hereinafter explained in more detail. This belt moves the ware a predetermined distance to a transfer station in front of a synchronized carrier in the form of an endless conveyor 31 for carrying the ware through the dryer 32 to another endless belt conveyor 33 at the rear of the dryer for carrying ware away. During this movement of the ware in single file from the decorating station to the dryer transfer station, the ware from successive cycles of the decorating machine is intermingled or infiltrated whereby orderly rows or lines of predetermined identity may be subsequently placed upon the dryer conveyor. The freshly decorated ware is removed from conveyor 30 and placed on conveyor 31 in orderly rows automatically by push-type transfer apparatus generally indicated by the reference character 34. The operation of the automatic apparatus is controlled by the decorating machine as will be hereinafter explained.

The decorating machine of this apparatus, Figures 2 to 5 inclusive, comprises a frame 35 having suitable horizontal, vertical and transverse frame components upon which to mount the several elements which comprise this machine. In front of and above each decorating station is a ware dealer, and, since all of them are similar in structure, I will describe only one of them in detail.

It is desired to support a bung of ware by means that may be automatically operated to release one piece of ware at a time from the bottom of a bung to a transfer device.

Figures 6, 7:
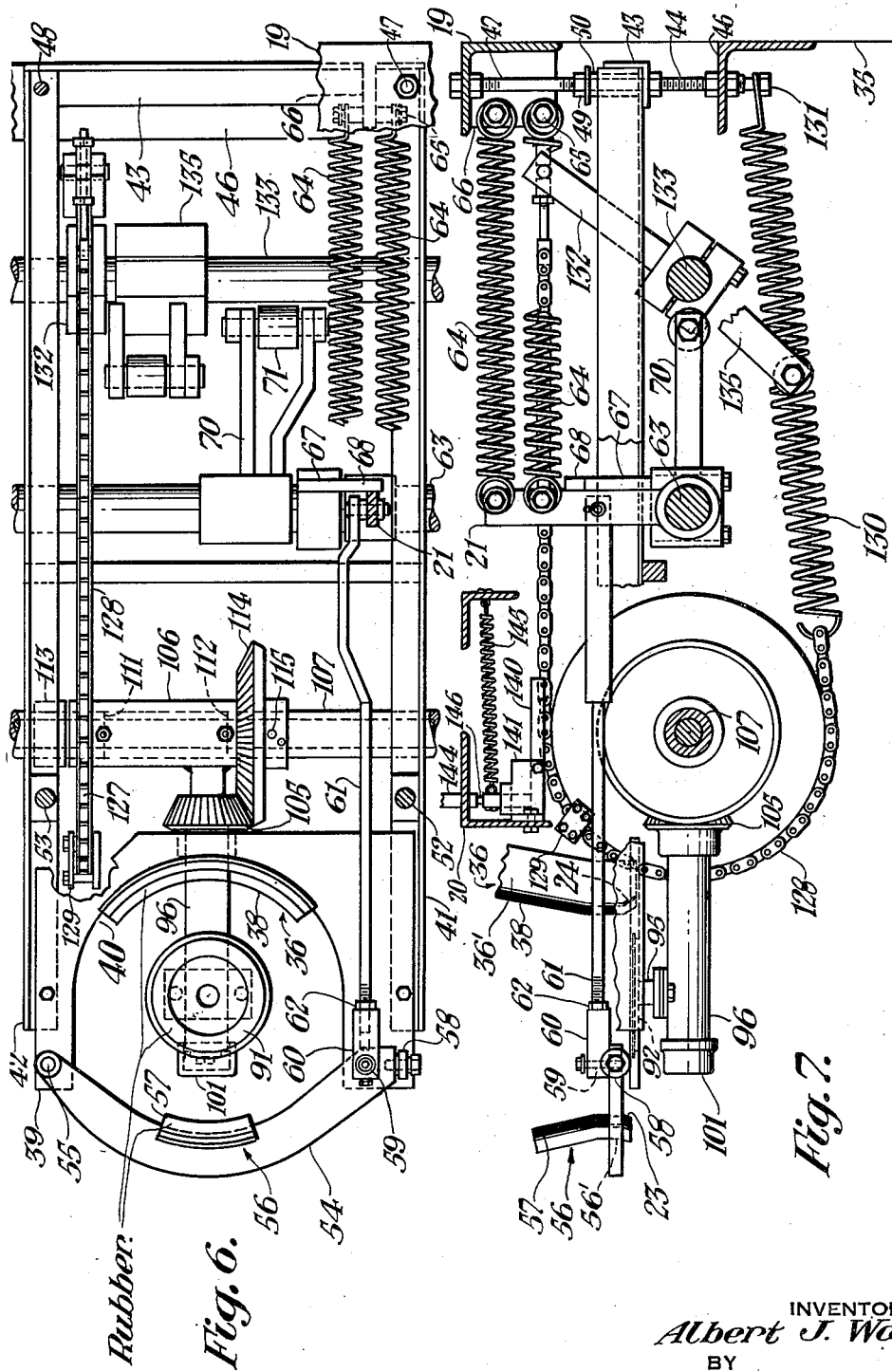
Figure 6 is a top plan view of the dealer showing also the transfer device and some of the actuating mechanism for both.
Figure 7 is a side elevation of the structure shown in Figure 6 with a part of the dealer broken off.

Said dealer comprises a member 36, Figures 6, 7 and 8, formed with a vertically extending, inclined, ware support section 36' and a lower, vertically disposed, gripping jaw section 37. Said member is preferably formed like a shallow trough with the concave side presented to the ware. This surface is lined with resilient material such as rubber indicated by the reference character 38.

Member 36 is supported by a plate 39 to which it is rigidly secured preferably by welding the lower end of gripping jaw section 37 thereto on the inside of a semi-circular recess 40 formed in the plate. Plate 39 is bolted to and supported by a pair of spaced, parallel angles 41 and 42 that are braced across the rear ends by a cross angle 43 thereby forming a rectangular frame that is supported on the machine frame for vertical adjustment in the following manner: Angle 43 rests upon a pair of vertically adjustable studs 44 and 45, Figures 2, 3, 4, 7 and 8, threaded into a cross angle 46 of the machine frame and common to all the dealers. Angle 43 is clamped against these studs by a pair of spaced studs 47 and 48 thereabove that are threaded downwardly through the top, rear, cross angle 19 of the machine frame 35. Studs 47 and 48 are provided with sleeves 50 which bear against angle 43 and are secured by nuts 49 to hold the rear end of the frame against displacement at the adjusted level. Adjustable hangar bolts 52 and 53 support the front end of the dealer frame from a front, top, cross angle 20, of the machine frame, common to all the dealers, Figures 4, 6, 7 and 8. Thus the dealer frame may be adjusted upwardly or downwardly to the desired elevation and leveled.

In order to grip the lowermost piece of a bung of ware as aforesaid, a curved lever 54, Figures 6, 7 and 8, is pivoted on a pin 55 carried by plate 39 and located near the open end of the recess. At the center of the lever and on the inside curve is secured another guide and jaw member 56 which is similar to member 36 except that it is smaller in width and height. The upper section of this member is inclined relative to jaw section 56' which is welded or otherwise secured to lever 54 in a position diametrically opposite the jaw section of member 36 when the jaws are closed. Member 56 is also formed like a shallow trough and has substantially the same radius of curvature, at least in the jaw zone, as the other member. This radius of curvature preferably conforms to the curvature of the ware. In order to compensate for fractional differences in diameter of the ware, and to avoid damage thereto, the jaw portion 56', Figure 7, is also lined with resilient material 57 which may extend over the entire trough-like surface of the member if desired.

At the free end of lever 54 is a roller 58 rotatably mounted upon a horizontal stud screwed into the end of the lever. Said roller is adapted to rest upon and roll on plate 39 and to support the free end of the lever.

Means for automatically moving lever 54 to cause the jaws to grip the ware, as depicted in Figure 10, and to release the ware, as illustrated in Figure 9, comprises a vertical pin 59 rigidly secured in a hole near the outer end of lever 54. To this pin is pivotally attached a connector 60 into which a pull rod 61 is adjustably screwed and held in position by a nut 62. The clearance between the jaws may be conveniently adjusted by removing connector 60 from pin 59 and screwing it in one direction or the other on pull rod 61.

Figure 3:
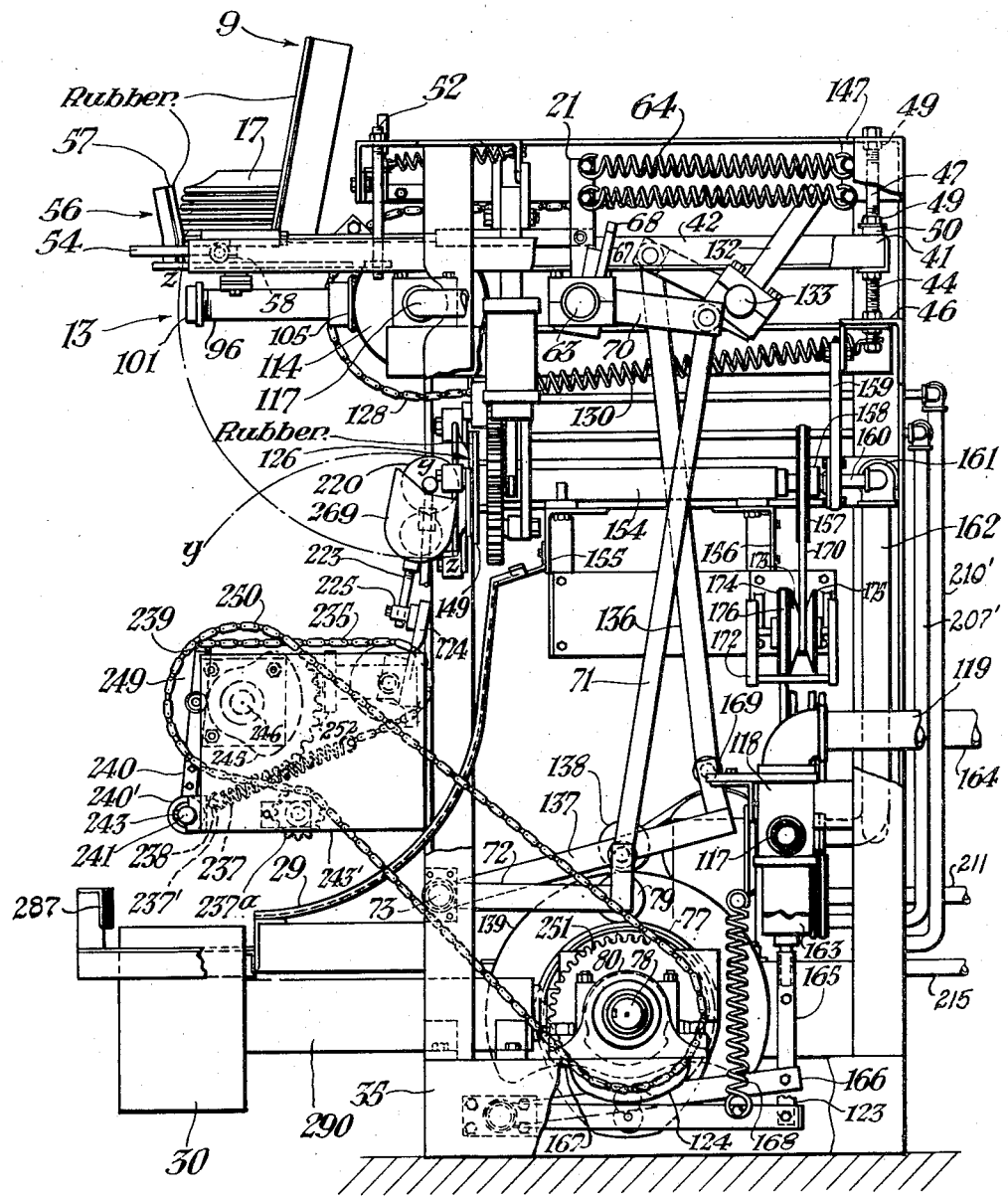
Figure 3 is a right end elevation of the decorating machine.
Figure 4:
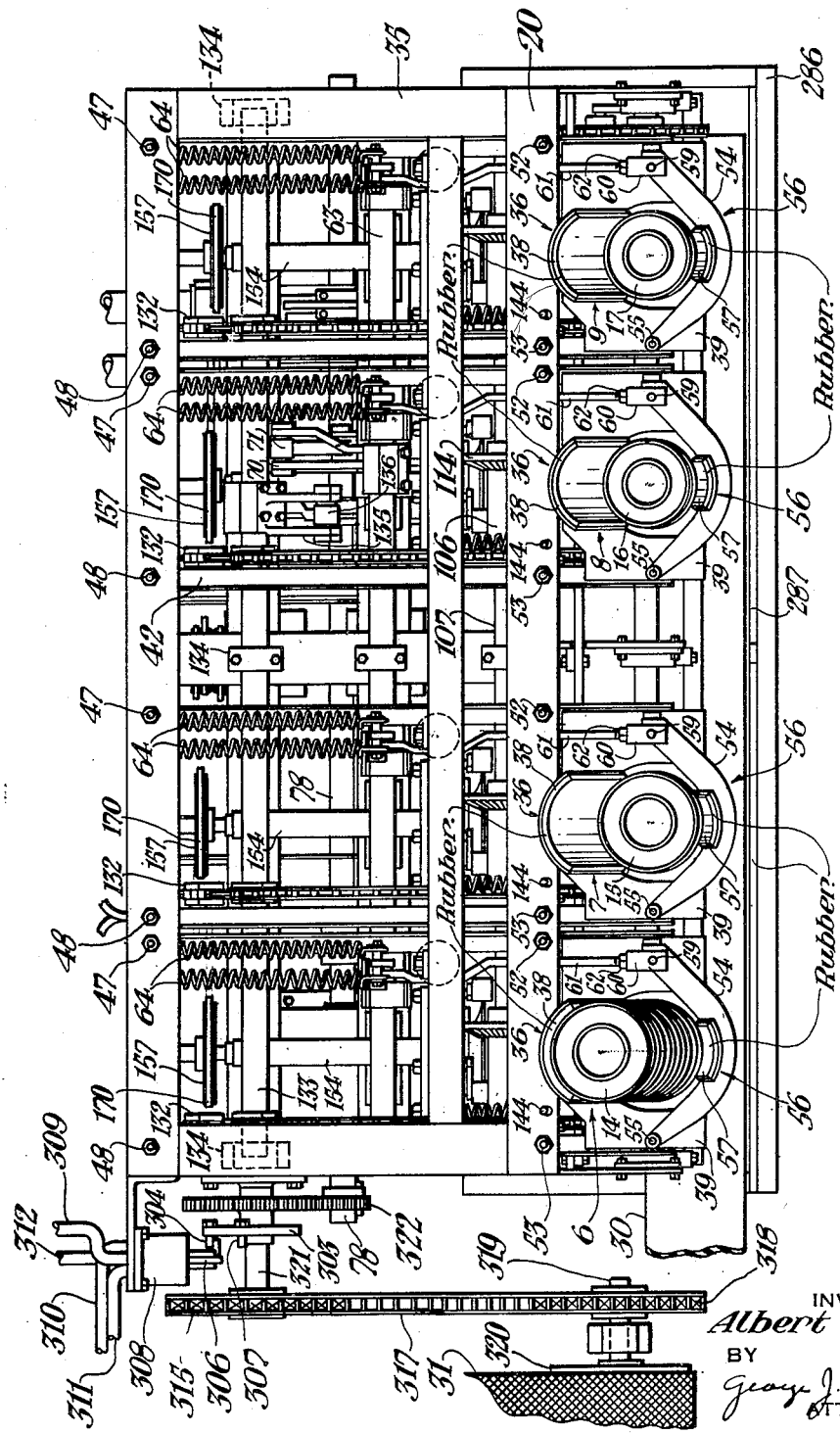
Figure 4 is a top plan view of the decorating machine.

Pull rod 61 is pivotally attached at the other end to a vertical lever 21 mounted on a frame supported, cross shaft 63, Figures 3, 4 and 7, common to all of the dealers. Said levers 62 is freely rotatable on shaft 63 and gripping pressure is applied on the ware by plural coil springs 64 attached to the upper end of lever 21 and anchored at the opposite end to bolts 65 secured in a bracket 66 rigidly fixed to machine frame 35.

To relax the pressure of the gripping jaws upon the ware, lever 21 is rotated in the opposite direction against the tension of the coil springs by a lever 67 clamped to shaft 63 and rotatable therewith. Each lever 67 has a horizontal projection 68 adapted to engage lever 21 and turn it in the same direction as shaft 63 when shaft 63 is turned in a counterclockwise direction as viewed in Figure 3. Shaft 63 is common to all of the dealers. This action opens all of the jaws of the several dealers and permits each bung of ware to drop down, Figure 9, then upon reverse rotation of shaft 63, Figures 6 and 7, springs 64 associated with each dealer, close the gripping jaws with which they are associated, and, to make certain that adequate retaining pressure is applied to the ware, each lever 67 is adjusted so as to turn clockwise, Figure 3, sufficiently to disengage associated lever 21.

Shaft 63 is rotated by a bifurcated lever 70 which is clamped thereto. Said lever is pivotally connected to a push rod 71, Figures 2, 3 and 5, connected to a bifurcated lever 72 having a bearing sleeved on shaft 73 supported by bearings 75, Figure 2, mounted on the machine frame and by support 76. Lever 72 is raised by means of cam 77, fixed on the cam shaft 78 of the decorating machine which engages a cam roller 79 rotatably supported between the bifurcated part of the lever. The working surface of this cam is developed so as to provide for the opening and closing of the gripping jaws in the manner previously described.

Figure 5:
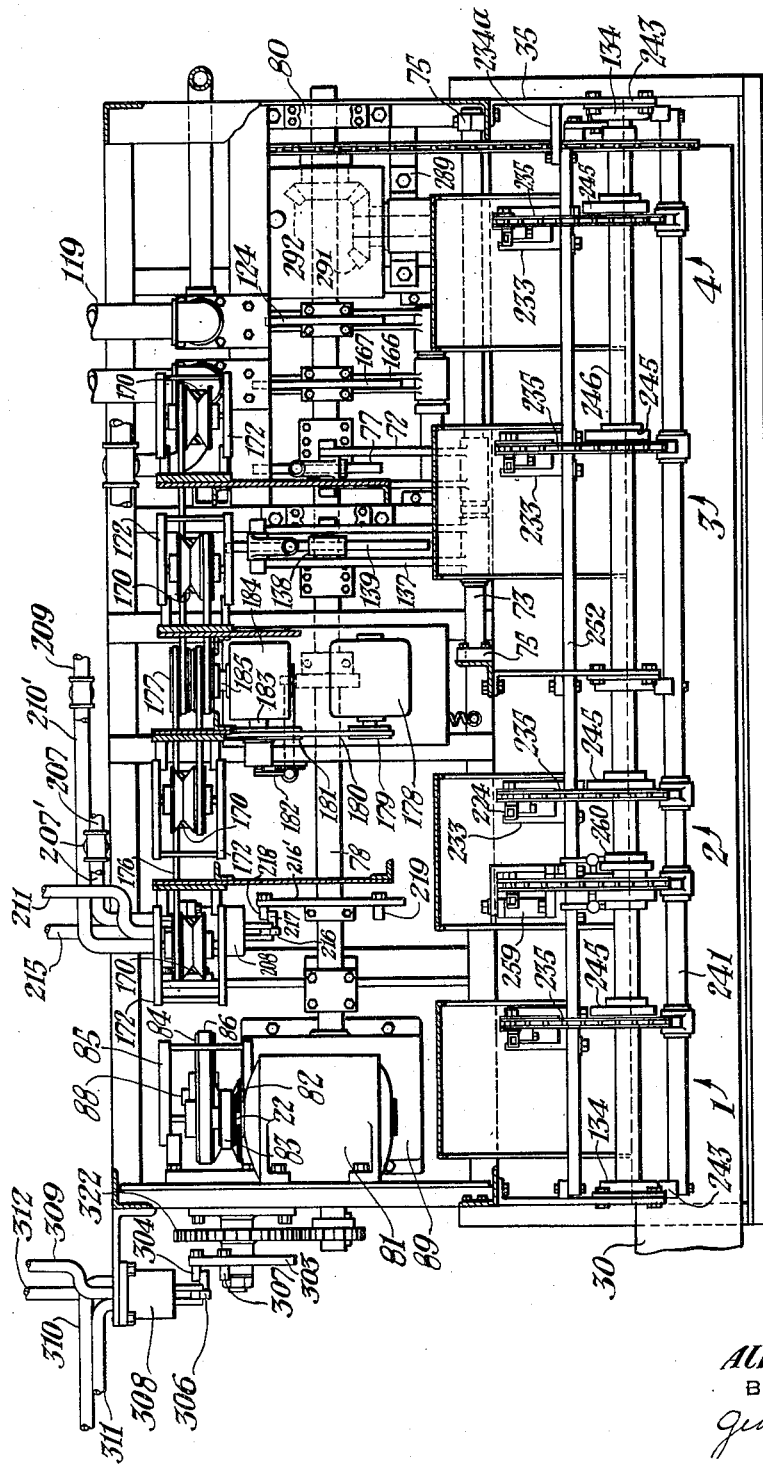
Figure 5 is a horizontal section taken on line 5—5 of Figure 2.

Cam shaft 78, Figures 2 and 5, is supported in bearings 80 at various locations along the decorating machine frame 35 and is driven by a motor 81. The drive includes a pulley 82 on motor shaft 22, a V-belt 83, which drives a variable speed pulley transmission 84 controlled by a manually operable lever 85, said transmission 84 being connected by a V-belt 86 to a pulley 87 on the drive shaft 88 of a reduction gear transmission enclosed in housing 89 and to which shaft 78 is connected. Thus the speed of rotation of cam shaft 78 may be varied manually by means of lever 85 which means that the rate of discharge of ware from all of the dealers may be increased or decreased in accordance with the requirements of production.

Ware is carried from each of the dealers 6, 7, 8 and 9 to its associated decorating station by the transfer devices 10, 11, 12 and 13 previously mentioned. Since these devices are similar in construction and operation, only one of them will be described in detail.

With reference to Figures 6, 7, and 8, 90 is a vacuum chuck formed with a rubber sealing ring 91 demountably secured to a circular plate 92 having a central aperture 93 therein communicating with a vacuum passage 94 in a pedestal 95 which is welded to a hollow, tubular sleeve 96 forming part of a transfer arm. Said sleeve is rotatably telescoped upon a hollow tubular pipe 97 and sealed against leakage thereagainst by bushings 98 and 99, bushing 98 being held against axial displacement by a circular plate 100 bolted over the open end of pipe 97 and bushing 99 being seated against a shoulder formed on the pipe. A cap 101 screwed onto the end of sleeve 96 also acts as a vacuum seal. Vacuum passage 94 communicates with the hollow interior of pipe 97 through a hole 102 bored through the shaft. Communication is also established through the clearance space 103 between the sleeve and pipe and another hole 104 in pipe 97 adjacent hole 102. 105 is a pinion gear fixed on sleeve 96.

Each pipe 97 is welded to an associated hollow sleeve 106, see Figures 2 and 6, that is telescoped upon a stationary pipe 107 secured in end clamps 108 and 109 mounted upon machine frame members disposed at opposite ends of the frame and a center clamp 110 also mounted upon a frame upright. Said sleeve is larger in diameter than the pipe so as to allow ample clearance for the insertion of sleeve bearings 111 and 112, Figure 6, in opposite ends thereof, which seal the ends of the sleeve and upon which the sleeve turns about the axis of pipe 107. Axial displacement in one direction is prevented by a set collar 113 and in the other by a gear 114, which meshes with pinion 105, and is fixed on the shaft by set screws 115. Pipe 107 has a hole 116 therein, Figure 8, by means of which communication is established between pipes 97 and 107. Since there are four of these transfer devices shown, pipe 107 is therefore provided with four vacuum ports, and in order to vacuumize the interior of the pipe, a pipe 117, Figures 2 and 3, is threaded into the end of pipe 107 and connected to the inlet of a valve 118 having an outlet connected by pipe 119, Figure 5, to a tank 120, Figure 1, in which a vacuum is created by pump 121. Valve 118 has a valve stem 122, Figure 2, connected to a pivoted lever 123 which is raised and lowered by the action of a cam 124 on cam shaft 78 to thereby open and close said valve in timed relation with the other operations of the machine, see Figure 3.

Thus, to deliver a piece of ware from a bung to the decorating chuck 126 associated therewith, the vacuum chuck 90 is turned about the axis of pipe 107 for approximately 90°, see Figure 8, by apparatus to be presently described. Incident to this movement, the chuck 90 is also caused to rotate, Figure 11, about the axis of pipe 96 for approximately 120° as a result of the pinion 105, Figures 6, 7 and 8, being turned by the stationary gear 114. Thus, as illustrated in Figure 8, ware taken from the dealer in horizontal inverted position is carried to a lower level and in transit revolved so as to present the back or foot ring zone of the ware to the decorating chuck 126 in a vertical position.

The apparatus for moving a transfer chuck 90 from its associated dealer to an associated decorating chuck comprises a disc 127, Figures 7 and 8, over which a sprocket chain 128 is trained. The sprocket chain is securely fastened to the disc by a clamp 129, Figure 12 attached to the disc. The sprocket chain is connected at one end to a coil spring 130, Figures 3, 6, and 7, anchored to a stud 131 connected to the machine frame. The other end of the sprocket chain is attached to a lever 132 that is fixed on shaft 133, this shaft being common to all of the transfer devices and it will be understood that for actuating each transfer device, a lever 132 is clamped to rotatable shaft 133 at the proper position.

Shaft 133 is mounted for rotation in bearings 134, Figure 4, supported by the machine frame. Said shaft is rotated by a crank 135 fixed on the shaft which is pivotally connected to a push rod 136 that in turn is pivotally connected to a lever 137 pivoted on the machine frame. Lever 137, Figures 2 and 3, is provided with a cam roller 138 that engages the periphery of cam 139 secured to cam shaft 78. The working surface of this cam is formed for moving the chuck carrying arm of the transfer device in the manner aforesaid.

The operation of any one of the transfer devices may be arrested without interrupting the operation of the other transfer chucks by a lockout device shown in Figures 7 and 8. This lockout device comprises a bar 140 pivotally attached to a bifurcated lug 141 secured to the inside of the vertical web of the top, front, cross angle 20 of the machine frame, see Figure 4. Stop bar 140 has an off-center pivot 142 so as to allow the long end of the bar to drop down by gravity into a position where it may engage lug 143, see dotted line position in Figure 8, welded on the side of disc 127 when vertically movable pin 144 is raised by hand. Said pin is slidable in oversized hole 146' in angle 20 and may be held in raised position by the combined action of a spring 145 which pulls the pin off center and causes the lower groove 146 to move into interfitting relation with the angle around the rim of the hole. To lock the pin in lower position to thereby disengage the stop bar 140 from the lug 143, the pin is unlatched and depressed until the upper groove 147 locks in the hole as aforesaid.

All of the decorating chucks 126 are similar in construction and operation. They are rotated by a motor drive common to all of them, however, the speed of rotation of each of the chucks may be individually controlled and varied.

In commercial practice, some of the ware will be crooked or over or under size. To prevent crooked or undersize ware from prematurely falling from the dealer, I propose to grip some of the bung components in a resilient external embrace as would be provided by a pad of rubber or the like of sufficient thickness to allow for differences in the diameter of the ware. The ware transfer device, which in this structure includes a transfer arm with a ware support thereon, is adapted to position the ware support below and in close proximity to the lowermost piece of ware in the bung. When the gripping pressure on the bung components is relaxed, the entire bung drops down upon the ware support and when the gripping pressure is again applied, it may also be effective on the lowermost piece in the bung but at a lower value than on those pieces of ware thereabove. This may be accomplished by forming the troughs 56 and 36 with gripping jaw sections 23 and 24 respectively, as shown in Figure 7, that are divergent or outwardly tapered. Although the lowermost piece of ware, under this circumstance would not be fully released from the dealer, should the transfer fail to grip the piece, say for instance, because of some crooked or warped condition of the ware or for some other reason, the piece will not fall from the dealer, but will remain in place until removed by hand. Of course, the ware may, if desired, be released entirely from the gripping jaws by locating the lower end of the jaws above the position the piece would normally occupy when resting upon the ware support. Thus, the dealer may be formed for either wholly releasing the ware or retaining the piece with a light pressure requiring that the transfer device pull it from the dealer.

Figure 13:
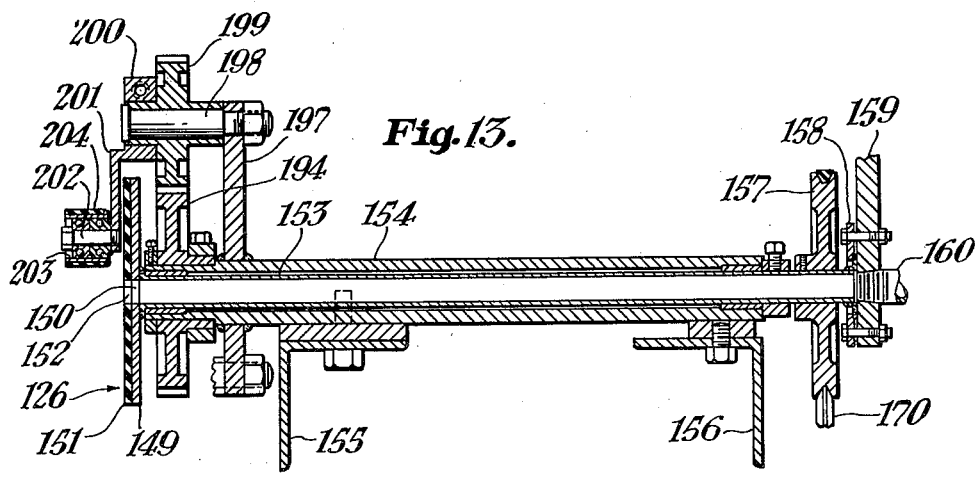
Figure 13 is a vertical section through one of the decorating chuck assemblies.

Each decorating chuck comprises a circular disc 149, Figures 3 and 13, having a central aperture 150 upon which a rubber face plate 151, also having a center hole 152, is superimposed, and cemented, or otherwise secured in place. This resilient face plate forms the ware engaging surface of the chuck. Said chuck is fixed on one end of a hollow, rotatable shaft 153 journaled in bearings and carried inside of an elongated housing 154. Said housing is supported upon a pair of spaced, parallel angles 155 and 156, Figures 2 and 3, which are supported by the machine frame and extend from end to end thereof. These angles provide a support for all of the housings 154 which support the shafts that carry the decorating chucks.

Each decorating chuck shaft, Figure 13, is rotated by a motor drive, to be presently described, connected to a pulley 157 fixed on the rear end of each chuck shaft. In order to vacuumize the several decorating chucks, a shaft seal 158 supported by bracket 159, Figure 3, attached to the machine frame, is mounted in sealing relation with the rear end of each hollow chuck shaft 153. A stationary pipe 160 is connected to each seal and to a main header 161 common to all of the decorating chucks. Said header is connected by a pipe 162, Figure 3, to a valve 163 having a pipe 164 leading to the tank 120, Figure 1, associated with the vacuum pump. Said vacuum valve is provided with a control rod 165, Figures 2 and 3, attached to a pivoted lever 166, Figure 3, actuated by a cam 167 fixed on main cam shaft 78 and springs 168. Said valve is supported from the machine frame by means of a bracket 169.

With reference to the drive for rotating the several chuck shafts, each pulley 157, Figure 4, is driven by a V-belt 170, Figures 2, 5 and 13 connected to a conventional manually adjustable, variable speed transmission 171, Figure 5. Each variable speed transmission has a manual control 172 for changing the speed of the drive as between the driven belt 170 and the driving belt 176. The driving belt 176 associated with each of the variable speed transmissions is connected to a plural groove pulley 177, common to all of said driving belts. Pulley 177 is driven by an electric motor 178 whose drive pulley 179 is connected by a V-belt 180 to a pulley 181, Figure 5, which forms the driving disc side of a clutch whose driven disc 173 (not shown) is fixed upon a shaft 183 connected to a reduction gearing inside of housing 184, Figure 5. Pulley 177 is fixed upon the power output shaft 185 of the reduction gearing.

Figure 15:
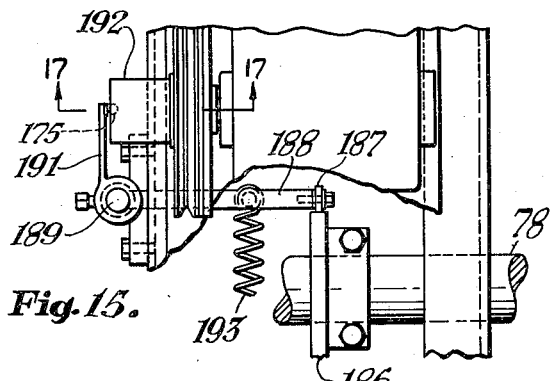
Figure 15 is a detail in plan view of the clutch control associated with the drive mechanism for the decorating chucks.
Figure 17:
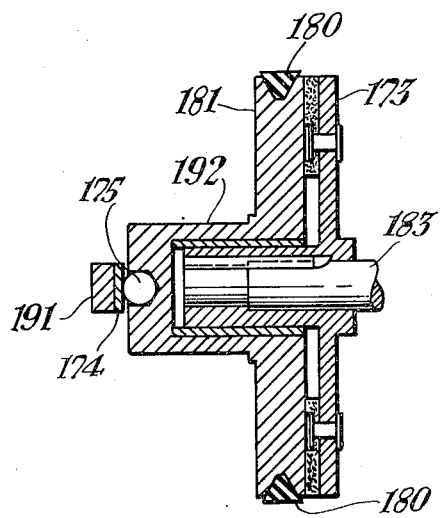
Figure 17 is a detail in section showing the clutch collar for the clutch of Figure 15.
Figure 16:
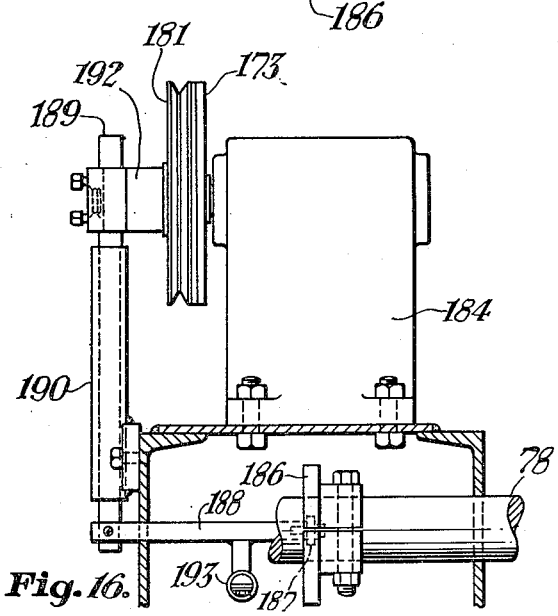
Figure 16 is an elevation of the apparatus shown in Figure 15 with some of the parts broken away.

The several decorating chucks are intermittently rotated. They are stopped at the time ware is delivered thereto and released therefrom. All of the chucks are controlled, insofar as intermittent stopping and starting is concerned by a friction clutch formed by driving disc 181 and driven disc 173 that is common to all of the chucks. This intermittent operation is in timed relation with the movement of the ware transfer chuck and is controlled by a clutch shifting means comprising a lever 188, Figure 16, secured to a vertical shaft 189 rotatable in a stationary bushing 190 supported by the machine frame. A lever 191, Figures 15 and 17, is secured to the upper end of shaft 189 and is provided with a hardened, wear resistant surface 174 for engaging a ball 175 set in a hole in the end face of the hub 192 of driving disc 181. For disengaging the clutch, a cam 186, Figures 15 and 16, fixed on shaft 78 is provided. Said cam engages a roller 187 mounted at the end of lever 188. The working surface of the cam is developed in accordance with the intermittent clutch action desired. The clutch is engaged by a coil spring 193 connected to lever 188 and to a stationary part of the machine frame.

In order to center the ware relative to the axis of rotation of each of chucks 126, Figure 2, when said ware has been delivered thereto and gripped thereby, a centering apparatus, Figure 14, is provided for each chuck which comprises, a gear 194 rotatably mounted, as shown in Figure 13, upon the forward end of housing 154. Clamped to the elongated hub 195 of the gear, is a lever 196 by means of which the gear is rotated by apparatus to be presently described.

In rear of the gear, a spider 197 is welded to the housing and at ends of the three spider arms are holes for receiving stub shafts 198 upon each of which a gear 199 is rotatably mounted that meshes with the large gear 194. Clamped on the extended hub of each gear is a clamp ring 200 to which is welded in a radial position an arm 201 having a threaded hole at the end thereof into which is screwed a pin 202 upon which a roller 203 is mounted. The surface of each roller is covered with resilient material 204 such as rubber so as to avoid damage to the rim of the ware during the centering action. In operation, these rollers 203 are all moved inwardly toward and into engagement with the ware brim at the same time upon rotation of gear 194 in a clockwise direction. This causes the ware to be centered relative to the axis of chuck 126. The rollers are immediately retracted with little or no dwell, by reversing the rotation of gear 194.

Each lever 196 is connected to the piston rod 205 of an associated air cylinder 205′ having a lower air inlet connected by pipe 206 to a main header 207, Figure 2, having a pipe 207′ leading to the pressure outlet of a four-way valve 208, Figure 5. The upper inlet of the air cylinder is connected by a pipe 209, Figure 2, to main header 210, connected by pipe 210′ to another pressure outlet of four-way valve 208, Figure 5. The inlet side of valve 208 is connected by pipe 211 to the outlet of a pressure equalizing tank 212, Figure 1, connected by pipe 213 to a motor driven pump 214. 215 is an exhaust pipe to be alternately connected to pipes 207′ and 210′ to vent them to atmosphere upon alternate strokes of the several air cylinders 205′. Valve 208 is provided with an actuating rod 216, Figure 18, having a roller 217 attached to the end thereof. This roller is positioned so as to be engaged by a pin 218 projecting from a disc mounted on main cam shaft 78 and thereby moved in one direction and to be engaged by another pin 219, spaced radially outwardly from the first pin on said disc and moved in a reverse direction. These pins are insertable in any one of a circle of holes in the disc so that adjustment may be made in the time of operation of the valve by relocating one pin or the other or both of them.

Thus, all of the centering devices are actuated simultaneously, however, the radial setting of each centering roller may be varied by loosening the clamps 200, Figure 13, and angularly adjusting the same on the hubs of gears 199. Since the production may be diversified, and this comprehends ware of both large, small and intermediate diameter, the radial setting of a circle of centering rollers, as between decorating stations, could be different.

If it is desired to operate the centering rollers by hand, for adjustment purposes, the pin connecting the lever 196 and piston rod 205 may be removed and the lever operated manually. This could be done without interrupting the operation of the machine.

Figures 18, 27:
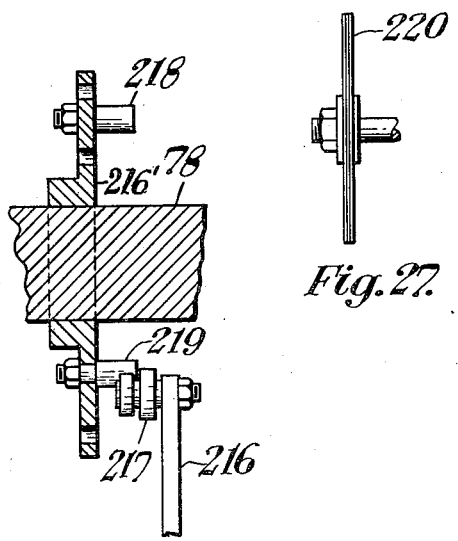
Figure 18 is a detail of a timer.
Figure 27 is a detail view of a lining implement.

The automatic decorating apparatus which is mounted in front of each decorating chuck 126 is provided with a rotatable color applying implement 220 preferably in the form of a single disc or a multiple of discs, see Figure 27, clamped together to form a single paint applying implement, which is supported, Figure 3, for movement inwardly toward the chuck to act upon the ware and in a reverse direction a sufficient distance to clear the arc of travel of the ware transfer arm as it moves between the dealer station and the ware decorating station. Other forms of implement, for instance, those types employing a wick or brush, may, if desired, be used.

The four decorating stations of the illustrated machine may be equipped to produce single or plural lines, bands or stripes upon the surface of the ware. Since the terms "line," "band" and "stripe" are substantially synonymous, I may refer to the implements as "lining," "banding," or "striping" devices or even "decorating" devices or implements in which case it will be understood that any one of the terms, when so used, may be considered as generic to all of them.

It will be understood that single or plural lines may be applied to the ware at any one of the stations. In Figure 2, I have shown for illustrative purposes, how the machine would be equipped to produce a single line upon the surface of the ware at stations 1, 3 and 4 and plural lines at station 2. At stations 1, 2, 3, and 4, a banding disc 220 and associated paint supplying and operating mechanism is arranged at the right of the center of the ware held by the chuck at each of these stations. At station 2, a second banding disc 220 and associated paint supplying and operating mechanism is located at the left of the center of the ware held by the clutch at this station. These operating mechanisms may be of the traversing or non-traversing type, to be hereinafter described in detail.

In some instances it is desirable to make a wide line. I accomplish this by moving the banding wheel across the surface of the ware whilst the line is being applied. The apparatus for imparting a traversing motion to the lining wheel has certain differences in construction as compared with the non-traversing type of apparatus. Both forms will be hereinafter described. Either one or both forms may be employed at any one or all of the decorating stations.

Figure 25:
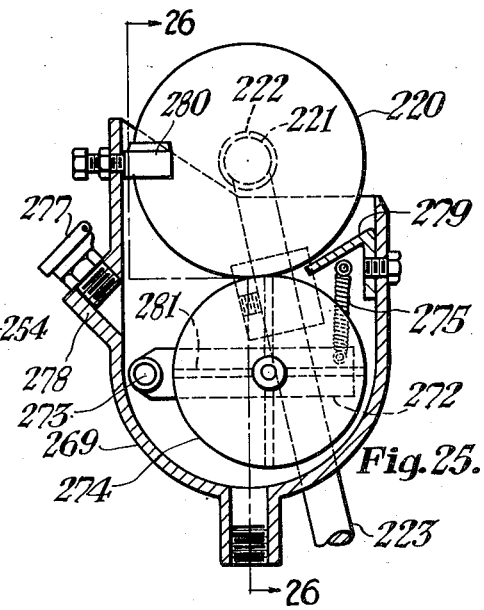
Figure 25 is a sectional elevation through a paint receptacle.

The non-traversing type of decorating apparatus is constructed as follows: the decorating implement 220, Figures 3 and 25, is rotatably mounted upon an axle 221 journaled in a sleeve bearing 222 secured to the top of a rod 223. Said rod is supported in a clamp 225 and is vertically and rotatably adjustable therein in order to facilitate the setting of the banding wheel relative to the working position. Clamp 225 is rotatably mounted on a holder 224 and may be tightened in various angular positions of adjustment by bolt 226, Figures 19 and 20. Holder 224 is attached to a clamp 227 which is clamped around shaft 230 supported for rotation in stationary anti-friction bearings 231 and 232. Said bearings are supported by a U bracket 233, whose ends are formed as split clamps for receiving said bearings. Said bracket is fastened to a cross beam 234 Figure 5 by bolt 234, said beam being bolted to lugs 234a projecting from the machine frame.

To move the banding wheel inwardly toward the ware and in a reverse direction, a disc 229 is secured to shaft 230. A sprocket chain 235, Figures 3 and 20 is trained over the periphery of the disc and is fastened by means of a clamp 236 thereto, see Figure 20. The chain is attached to a coil spring 237, see Figures 3 and 23, connected to a lever 240 having a bearing 240' rotatably mounted upon a stationary shaft 241, Figure 3, attached by bolts 243 to vertical plates 243' fixed to the ends of the machine frame. The other end of spring 237 is attached to a lug 237' secured to the bearing housing 240', Figure 3.

Figure 23:
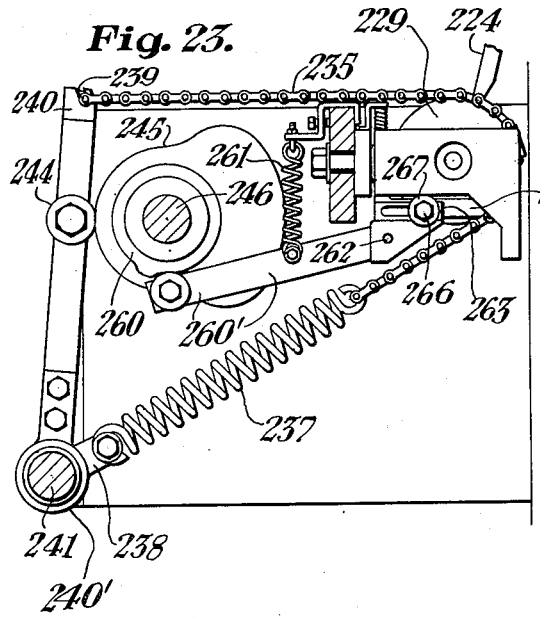
Figure 23 is a detail of the banding wheel assembly operating mechanism.

Lever 240, Figures 3 and 23, has a cam roller 244 engaged by an adjustable cam 245 mounted upon a rotatable cam shaft 246 journaled in bearings 247 and 248 secured to plates 243' located at opposite ends of the machine frame. Shaft 241 and shaft 246, Figures 2 and 3, are common to all of the decorating mechanisms and all of levers 240 and the cams 245 for actuating the several banding wheels or discs are mounted on these shafts respectively.

Cam shaft 246 is rotated by a sprocket 249 fixed thereon, chain 250 and sprocket 251 fixed on main cam shaft 78, Figure 3. As cam 245 rotates, chain 235 is pulled back to retract the banding disc 220 from the working position against the tension of spring 237 and as the working surface of the cam recedes, the spring is effective to move the banding disc into engagement with the surface of the ware and to apply the desired pressure thereto to reliably transfer the paint from the decorating wheel to the surface of the ware. The pressure is yieldingly applied to the banding wheel thereby allowing it to follow a wavy surface or one having irregularities therein without losing contact.

In setting the banding wheel it is often desirable to move the same by hand and, in such event, the chain 235 may be unhooked from the top of lever 240 to allow this to be done. If for some reason it is desired to render any given banding disc inoperative without affecting the operation of the other discs, the chain may also be unhooked.

It will be understood that banding disc or wheel 220 must be retracted from the surface of the ware a distance sufficient to clear the path of the ware transfer arm 96. Thus, the apparatus for supporting and actuating the disc is constructed to provide for a long throw in moving the banding disc between operative and inoperative positions. The banding wheel holder is pulled back beyond the point where the arcuate line Y—Y Figure 3 designating the arcuate path of travel of the banding disc 220, intersects the arcuate line Z—Z designating the outer limit of the path traversed by the ware during transfer from the dealer to a banding station. This is to avoid interference between the moving parts. This applies to all of the decorating and transfer mechanisms at all of the stations.

The traversing type of lining apparatus is also mounted upon cross member 252. It may be substituted for any of the non-traversing type lining mechanisms or may be operated in conjunction therewith at any of the stations, the latter arrangement being illustrated at station 2, Figures 2 and 5. Cross member 252 is provided with a series of holes 253 for receiving the attaching bolts 234.

The traversing type apparatus, Figures 21 and 22, is similar in some respects to the non-traversing type of Figures 19 and 20. The same form of holder 224 is employed as well as the clamp 227 and shaft 230 to which it is attached. Also fixed on this shaft is the actuating disc 229 to which the chain 235 is fastened by means of clamp 236. Shaft 230 however is journaled in anti-friction bearings 254 in a tiltable frame 255, Figure 22, instead of a stationary frame. Said frame is tiltable about a horizontal axis formed by anti-friction bearings 256 and 256' and the studs 257 and 257' respectively upon which they are journaled. Stud 256 is screwed into a stationary plate 258 having tapped holes therein by means of which the assembly is fastened to cross member 252 by bolts 234. Stud 257' is screwed into a tapped hole in the vertical leg 257a of a bracket 259 secured to stationary plate 258.

To produce the traversing motion, as for instance, an arcuate movement of the banding wheel when in contact with the ware, a lever 260', Figures 21 and 23, is provided which is actuated by a cam 260 on shaft 246 and a spring 261. Said lever is pivoted on pin 262, Figure 21, supported by a stationary bearing 263 welded or otherwise secured to stationary plate 258, the short arm 264 of the lever being located below the tiltable frame 255. Said short arm 264 has a horizontal slot 265 therein in which a roller shaft 266 supporting a roller 267 is mounted. The roller may be adjusted lengthwise of the slot in order to lengthen or shorten the effective length of the short arm of the lever. Thus, when the roller 266 is positioned directly above pivot pin 262 only a small amount of tilting movement is imparted to frame 254 whereas, when the roller is positioned at the other end of the slot, the maximum amount of tilting movement is obtained. In this manner, the width of the band being made by a traversing movement of the banding disc may be preset and adjusted. 268 is a return spring which opposes the upward tilting of frame 254. 268' is an adjustable stop-screw which, by engagement with a part 268a fixed on disc 229 limits the approach of the decorating implement to the surface of the ware.

Figure 26:
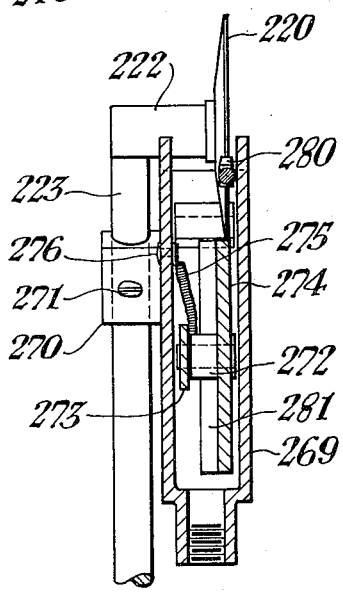
Figure 26 is an end elevation of the paint receptacle with the end removed so as to disclose the interior.

The banding wheel of either the traversing or non-traversing type of apparatus is supplied with color contained in a receptacle 269 in the following manner; said receptacle is attached to the rod 223, Figures 25 and 26, by means of a lug 270 having a hole therein through which the rod extends and a set screw 271 for tightening the receptacle in adjusted position thereon.

Said receptacle is formed with a deep and relatively narrow interior, the sides of the housing extending upwardly from the bottom to a greater distance at the rear than in front or on the end facing the decorating chuck 126. Inside the housing is a short bar 272, pivoted at 273 on the housing. This bar rotatably supports a friction roller 274 which is adapted to be rotated in the color or paint by the banding disc and to carry the paint up to the implement 220 which rotates thereagainst. The periphery of roller 274 is wider than disc 220 and is held thereagainst by a spring 275 which is connected to the free end to bar 272 and at the other end to a screw 276 threaded into the side of the receptacle. The receptacle is filled to a given level by pouring paint or color in from the top or by removing the filling plug 277 from the side inlet 278 and charging the receptacle from below the level of the disc 220.

The height differential, as between the ends of the housing is to prevent the spilling of paint from the receptacle when it is retracted to fullest extent from the decorating chuck, see Figure 3. Since the disc and receptacle move back on an arc Y—Y about the center of shaft 233, and the receptacle is thereby tilted, the extended rear side will prevent the spilling of the contents. When the banding disc moves forward to paint applying position, the inertia of the paint may cause spilling from the front side of the receptacle and therefor, I have provided a splash guard 279 positioned inside the receptacle and just below the front lip. 280 is a wiper which removes excess paint or color from the banding disc. 281 are blades attached to roller 274 to stir the paint as the roller revolves.

Ware that has been recorated is released from the vacuum chucks 126 simultaneously and is gravitated, four pieces at a time, onto the upper run of belt conveyor 30 where the same is accumulated in single file and moved to a transfer point in front of the dryer. Belt conveyor 30 forms part of an automatic apparatus for collecting and arranging the decorated production in orderly fashion for transportation through a drying zone. Belt conveyor 30 is mounted on rollers 282 and 283, Figure 1, one at each end of the frame and the upper run is supported by and travels over a flat plate 284 supported by brackets 285. An elongated stop bar 286 is located in front of the belt opposite the discharge end of the chutes 26, 27, 28 and 29 to check the momentum of the ware. This bar is adjustable for height and has a pad of rubber 287 or other resilient material facing the delivery end of the chutes so as to prevent damage to the ware brims should they strike the stop member.

To drive conveyor 30 in timed relation with the automatic decorating apparatus, roller 282 is fixed upon a shaft 288 journaled in bearings 289, Figures 3 and 5, inside sleeve 290 supported by the machine frame. A gear 291 fixed on the opposite end of said shaft is driven by a gear 292 fixed on the main cam shaft 78 of the decorating machine.

It is desired to automatically deliver the output from the four decorating stations in predetermined order and in closed up relation to the dryer transfer location. This is accomplished by automatically infiltrating or intermingling ware from several groups as follows: the stations are arranged in two groups, stations 1 and 2, Figure 28 form one group and stations 3 and 4, the other group. The center to center spacing of the chutes in group one is the same as the center to center spacing of the chutes in group two. The space between the two groups of stations is, however, greater than the space between the two stations of any one group.

In the normal movement of conveyor 30 (which moves continuously but which could be moved intermittently), each machine cycle is equal to the distance from the center of chute 28 at station 3 to a line midway between chutes 26 and 27. On the first machine cycle, four pieces of ware, $a$, $b$, $c$ and $d$, Figure 28 are delivered to belt conveyor 30 and pieces $a$, and $b$, are thereafter moved to the left beyond the chutes 26 and 27 and pieces $c$ and $d$ are moved to a position straddling chute 27, Figure 29. Then, upon the next machine cycle, pieces $e$ and $f$ from stations 1 and 2 are infiltrated with pieces $c$ and $d$ from the first group and the composite group $e$, $c$, $f$ and $d$ is moved out to the left, Figure 30, clearing the chutes and bringing up pieces $g$ and $h$ to the position straddling chute 27 previously occupied by pieces $c$ and $d$. Upon the third machine cycle, pieces $i$ and $j$ from stations 1 and 2 are infiltrated with pieces $g$ and $h$ from the preceding group and when conveyor 30 moves to the left, the composite group composed of pieces $a$, $b$, $e$, $c$, $f$ and $d$, are spotted in front of the dryer conveyor, Figure 31 and are ready to be pushed sideways, as a group, off conveyor 30, over gravity rollers 295 onto conveyor 31 to be carried thereby through dryer 32.

As this composite group of ware is moved to the transfer position, pieces $k$ and $l$ are moved to the position straddling chute 27 previously vacated by pieces $g$ and $h$. Upon the fourth machine cycle, pieces $m$ and $n$ are infiltrated with pieces $k$ and $l$ from the third machine cycle and this rounds out the first complete composite group of ware which is composed of pieces $i$ and $j$, Figure 32, produced by the third machine cycle; $g$ and $h$ during the second machine cycle; $m$ and $n$ during the fourth machine cycle and $k$ and $l$ during the third machine cycle. During the fifth machine cycle, this composite group of ware moves to a position in front of and halfway across the dryer conveyor 31 and upon the sixth machine cycle is spotted in front of the dryer conveyor, Figure 33, and is pushed off thereonto by transfer apparatus 34.

Figure 32:
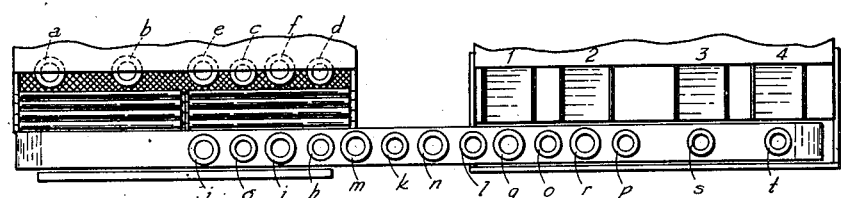
Figure 33:
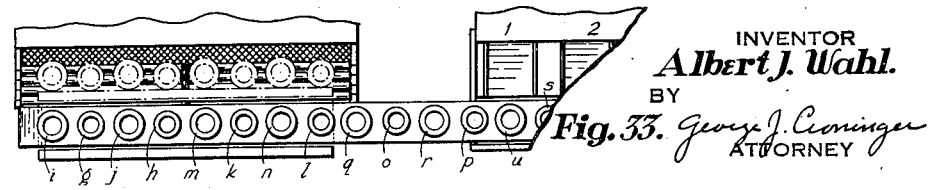

It will be noted that the ware passes through the dryer in orderly lines extending longitudinally thereof, the line sequence from left to right, Figure 32, being as follows: with reference to the stations where the ware originated, 1, 3, 2, 4, 1, 3, 2 and 4. There is no "mixing up" of the ware either in the individual lines or as between the lines. This facilitates selection and routing of the ware at the delivery end of the dryer and also, once the lines are established, permits immediate identification of the station where the ware originated by the line in which it is dried. In the case of defective decoration, this eliminated guess-work in locating the particular decorating apparatus responsible for the trouble, particularly when the production on all lines is same.

The transfer apparatus 34 comprises an air cylinder 299, Figure 1, supported upon a suitable frame 300. Attached to the piston rod 301 of the air cylinder is a horizontal blade 302 parallel with and above the upper run of belt 31 in position to engage and push the ware into the dryer. The engaging surface of the pusher is formed of resilient material such as rubber so as not to damage the ware brims.

To operate this air cylinder in timed relation with the movement of conveyor 30, a timer is provided which has a timing disc 303, Figure 5, fixed on a shaft 321 driven by a gear 322 fixed on cam shaft 78. Since the production set up is arranged for eight lines of ware through the dryer, the gear ratio in this instance is eight to one, it may be varied in accordance with the number of lines of production operating through the dryer. Said disc 303 has a pin 304 for moving a valve actuating rod 306 in one direction and a pin 307 for moving the rod in the opposite direction, the structure being substantially the same as that described in connection with the timing disc shown in figure 18. Actuating rod 306 is connected to a four-way valve 308 having an inlet connected by pipe 309 to air pressure tank 212. Pipe 310 is connected to an outlet of the valve and to the front end of cylinder 299 and pipe 311 is connected to another outlet of the valve and to the rear end of cylinder 299. As is customary in this type of valve, when the pressure is applied through one of the lines, for instance pipe 311, the other line 310 is connected to an exhaust pipe, here shown as 312. Thus, every eight revolutions of cam shaft 78, the air cylinder 299 is caused to operate.

The dryer conveyor 31 is driven continuously by the decorating machine in timed relation with the movement of conveyor 30 and the intermittent reciprocation of blade 302. The drive comprises a sprocket 315 mounted on shaft 316 which drives chain 317 connected to sprocket 318, Figure 4, on shaft 319 on which the dryer conveyor driving drum 320 is fixed. Thus the dryer conveyor 31, which is supported at the exit end of the dryer upon rotatable drum 321, is driven continuously at a low speed and at a speed which will permit successive rows of ware to be placed thereon with a minimum of clearance between rows. It will be understood that dryer conveyor 31 may be driven intermittently if desired.

I claim:

1. In apparatus for use in making decorated dinnerware, a power driven dinnerware decorating machine having plural decorating stations, a chuck and ware decorating means at each station, automatic ware dealing and transferring apparatus associated with each station for supplying the ware to the chuck at that station, automatic apparatus for arranging the decorated ware discharged from the machine in orderly rows, a conveyor between each station and said automatic apparatus for carrying said discharged ware to said apparatus, conveying means for receiving the ware from the last named apparatus and carrying the same away and means whose operation is controlled by the machine for operating said automatic apparatus and said conveying means.

2. In apparatus for use in making decorated dinnerware a power driven dinnerware decorating machine having plural decorating stations, a chuck and ware decorating means at each station, automatic ware dealer and ware transfer apparatus associated with each station for supplying ware to the chuck at that station from operator replenished, dealer supported, stacks of ware, automatic apparatus for collecting the output of the machine and arranging the same in orderly rows, a conveyor between each station and said automatic apparatus for carrying said output to said apparatus, and means whose operation is controlled by the decorating machine for operating said automatic apparatus.

3. In apparatus for use in making decorated dinnerware, a power driven dinnerware decorating machine having plural decorating stations, a chuck and intermittently movable decorating means at each station, automatic ware dealer and ware transfer apparatus associated with each station for supplying ware to the chuck at that station from operator replenished stacks of dealer supported ware, automatic apparatus for collecting the output of the machine operable to form the ware into orderly rows, a conveyor between each station and said automatic apparatus for carrying said output to said apparatus, conveying means for carrying the rows through a drying zone and means, whose operation is controlled by the machine for operating said automatic apparatus and said conveying means.

4. In apparatus for use in making decorated dinnerware, a power operated dinnerware decorating machine having plural decorating stations, a chuck and means for decorating ware at each station, automatic ware dealer and ware transfer apparatus associated with each station for supplying ware to the chuck at that station from operator replenished, dealer supported stacks of ware located above and in front of said stations and for turning the ware around incident to delivery thereof, conveying means common to all of the stations for receiving the output therefrom, a conveyor between each station and said automatic apparatus for carrying said output to said apparatus, means for periodically removing groups of ware from the conveying means, a second conveying means for receiving the groups of ware and carrying them away and mechanism operated by the machine for controlling the operation of said common conveying means and said second conveying means.

5. In apparatus for use in making decorated dinnerware, a power operated dinnerware decorating machine having plural decorating stations, a rotatable ware receiving chuck at each station, automatic ware centering apparatus and automatic apparatus for applying lines, stripes or bands to the ware at each station, automatic ware dealing and transferring apparatus associated with each station for supplying ware to the chuck at that station, automatic apparatus for assembling the output of the machine in groups and conveying the groups through a drying zone, means whose operation is controlled by the machine for operating said automatic apparatus and a conveyor between each station and said automatic apparatus for carrying said output to said apparatus.

6. In apparatus for use in making decorated dinnerware, a ware dealer, a ware transfer for carrying ware from the dealer to a decorating station, a decorating means at the decorating station, means for moving said ware transfer between the dealer and decorating station and means for turning the transfer so as to turn the ware around in transit between the points specified.

7. In apparatus for use in making decorated dinnerware, a ware receiving chuck, a ware dealer adjacent thereto, a ware transfer for carrying ware from the dealer to the chuck, ware decorating means adjacent said chuck, means associated with said transfer for gripping ware received from the dealer, means associated with said chuck for gripping ware delivered to it by the transfer, means for operating said transfer ware gripping means to release therefrom the ware delivered to the chuck, and means for intermittently, alternately operating said dealer and transfer and said transfer and said decorating means.

8. In apparatus for use in making decorated dinnerware, a power driven decorating machine having plural decorating stations, a ware dealer and ware transfer associated with each station, decorating means at each station including a decorating implement and means for moving the same into and out of working position and over the surface of ware at the working position, and means operated by said machine for actuating said ware dealer, transfer and decorating means in timed relation.

9. In apparatus for use in making decorated dinnerware, a power driven decorating machine having plural decorating stations, a ware dealer and ware transfer associated with each station, decorating means at each station including separately supported decorating implements and means for moving them relative to the ware at a decorating station, and means operated by said machine for actuating said ware dealer, transfer and decorating means in timed relation.

10. Apparatus for use in making decorated potteryware comprising a plurality of spaced decorating units, a conveyor driven with said units for carrying ware through a drying zone, and means for transferring the output of said units from the decorating machine to the conveyor and placing the same thereon in orderly rows including means for infiltrating ware acted upon during one cycle of the decorating units with ware acted upon during another cycle of the units.

11. Dinnerware decorating machinery comprising a decorating station, ware decorating means at said station, a dealer disposed near said station for releasing ware piece-by-piece from a stack thereof, and a ware transfer arm movable between said dealer and decorating station for carrying each released piece of ware to said station.

12. Dinnerware decorating machinery, comprising a plurality of spaced decorating units each including as elements thereof a ware decorator, a dealer for separating pieces of undecorated ware from a stack thereof, and mechanism for transferring such pieces to the decorator, coordinated drives for simultaneously actuating all of said like elements of the units in ware decorating cycles, a conveyor for simultaneously receiving in spaced relationship a plurality of pieces of ware from said decorators at the end of a decorating cycle, and means for advancing said conveyor to receive in spaces between the ware thereon pieces of ware decorated in a succeeding cycle.

13. Dinnerware decorating machinery, comprising a plurality of spaced decorating units each including as elements thereof a ware decorator, a dealer for releasing ware piece-by-piece from a stack thereof, and a ware transfer arm movable between said dealer and decorator for carrying each released piece of ware to the decorators, coordinated drives for simultaneously actuating all of said like elements of the units in ware decorating cycles, a conveyor for simultaneously receiving in spaced relationship a plurality of pieces of ware from said decorators at the end of a decorating cycle, and means for advancing said conveyor to receive in spaces between the ware thereon pieces of ware decorated in a succeeding cycle.

14. Dinnerware decorating machinery, comprising a plurality of spaced decorating units each including as elements thereof a ware decorator, a dealer for separating pieces of undecorated ware from a stack thereof, and mechanism for transferring such pieces to the decorator, coordinated drives for simultaneously actuating all of said like elements of the units in ware decorating cycles, a conveyor for simultaneously receiving in spaced relationship a plurality of pieces of ware from said decorators at the end of a decorating cycle, means for advancing said conveyor to receive in spaces between the ware thereon pieces of ware decorated in a succeeding cycle, a second conveyor for carrying the ware through a drying zone, and transferring means for transferring the ware from the first to the second conveyor, whereby the ware can be so arranged on the first conveyor that the output of the decorating units is carried in closely-adjacent lines on the second conveyor, each line containing ware from a particular unit.

15. Dinnerware decorating machinery, comprising a plurality of spaced decorating units each including as elements thereof a ware decorator, a dealer for separating pieces of undecorated ware from a stack thereof, and mechanism for transferring such pieces to the decorator, coordinated drives for simultaneously actuating all of said like elements of the units in ware decorating cycles, a conveyor for simultaneously receiving in spaced relationship a plurality of pieces of ware from said decorators at the end of a decorating cycle, and means for advancing said conveyor to receive in spaces between the ware thereon pieces of ware decorated in a succeeding cycle, said conveyor advancing means being coordinated with said drives for said decorating unit elements.

16. Dinnerware decorating machinery, comprising a plurality of spaced decorating units each including as elements thereof a ware decorator, a dealer for separating pieces of undecorated ware from a stack thereof, and mechanism for transferring such pieces to the decorator, coordinated drives for simultaneously actuating all of said like elements of the units in ware decorating cycles, a conveyor for simultaneously receiving in spaced relationship a plurality of pieces of ware from said decorators at the end of a decorating cycle, means for advancing said conveyor to receive in spaces between the ware thereon pieces of ware decorated in a succeeding cycle, a second conveyor for carrying the ware through a drying zone, and transferring means for transferring the ware from the first to the second conveyor, whereby the ware can be so spaced on the first conveyor that the output of the decorating units is carried in closely-adjacent lines on the second conveyor, each line containing ware from a particular unit, and said first conveyor advancing means, said transferring means and said second conveyor each having a drive coordinated with said drives for said decorating unit elements.

17. In apparatus for use in making decorated dinnerware, a ware decorating station, a dealer disposed near said station for releasing ware piece-by-piece from a stack thereof, a ware transfer arm movable between said dealer and decorating station for carrying each released piece of ware to said station, ware decorating means at said station, and means for operating said dealer, transfer arm and decorating means in timed relation.

18. In an apparatus for use in making decorated dinnerware, a ware decorating station, a ware dealer disposed near said station, a ware transfer arm movable between said dealer and decorating station for carrying undecorated ware to said station, ware decorating means movable in a vertical arc towards and away from said station, and means for intermittently and alternately moving said ware transfer and decorating means in timed relation.

19. In apparatus for use in making decorated dinnerware, a power driven decorating machine having plural decorating stations each provided with a chuck and means for applying decoration to ware supported by the chuck, said means being automatically movable into decorating contact with the ware, automatic ware dealer and ware transfer apparatus associated with each station for supplying ware to the chuck at that station including an intermittently actuated ware gripping device for supporting a stack of ware and releasing a piece at a time from the stack and a movable transfer arm having a grip device thereon formed for engaging and supporting dinnerware, and means operated by said machine for actuating said apparatus and said decorating means in timed relation.

20. In apparatus for use in making decorated dinnerware, a power driven decorating machine having plural decorating stations each provided with a chuck and means for applying decoration to ware supported by the chuck, said means being automatically movable into decorating contact with the ware, automatic ware dealer and ware transfer apparatus associated with each station for supplying ware to the chuck at that station including an intermittently actuated ware gripping means operable to release ware a piece at a time from the bottom of a stack, and a rotatable transfer arm for carrying ware from the dealer to a station and having means for turning the ware around in transit, and means operated by said machine for actuating said automatic apparatus and said decorating means in timed relation.

21. In apparatus for use in making decorated dinnerware, a power driven decorating machine having plural decorating stations each provided with a chuck and means for applying decoration to ware supported by the chuck, said means being automatically movable into decorating contact with the ware, automatic ware dealer and ware transfer apparatus associated with each station for supplying ware to the chuck at that station including an intermittently actuated ware gripping means operable to release ware a piece at a time, ware transfer arm and mechanism for rendering the arm inoperative during any number of repeated cycles of the decorating machine, and means operated by said machine for actuating said automatic apparatus and said decorating means in timed relation.

22. In apparatus for use in making decorated dinnerware, a power driven decorating machine having plural decorating stations each provided with a chuck and means for applying decoration to ware supported by the chuck, said means being automatically movable into decorating contact with the ware, automatic ware dealer and ware transfer apparatus associated with each station for supplying ware to the chuck at that station including an intermittently actuated ware gripping device for supporting a stack of ware and releasing a piece at a time from the stack, a movable transfer arm having a grip device thereon formed for engaging and supporting dinnerware, a main drive shaft for said machine and drive connections between said main drive shaft and said automatic apparatus and said decorating means for operating them in timed relation.

23. Apparatus for use in making decorated dinnerware and the like, comprising a decorating machine having a plurality of decorating stations, means movable to and from each station for feeding ware to that station, a ware discharge conveyor associated with each station, a ware carrier adjacent said ware discharge conveyor for receiving ware therefrom, means for intermittently moving said carrier to carry ware away therefrom, the movement of the carrier and the location of the conveyor being such as to intermingle the output from successive cycles of the machine, a carrier for carrying the ware through a decoration drying zone, and means for removing ware from the first carrier and placing the same on the second carrier in orderly rows.

ALBERT J. WAHL.

REFERENCES CITED

The following references are of record in the file of this patent:

UNITED STATES PATENTS

| Number | Name | Date |
|---|---|---|
| 1,865,436 | Ferguson | July 5, 1932 |
| 1,906,786 | Bowman, et al. | May 2, 1933 |
| 1,943,483 | Miller | Jan. 16, 1934 |
| 2,059,546 | Brandenburg | Nov. 3, 1936 |
| 2,062,425 | Peters | Dec. 1, 1936 |
| 2,166,268 | Simmons | July 18, 1939 |
| 2,203,572 | Johnson | June 4, 1940 |
| 2,380,306 | Halowell | July 10, 1945 |
| 2,380,509 | Emerson | July 31, 1945 |
| 2,413,446 | Glassner | Dec. 31, 1946 |